US012561234B2

(12) United States Patent
Liu et al.

(10) Patent No.: US 12,561,234 B2
(45) Date of Patent: Feb. 24, 2026

(54) PIXEL-BASED AUTOMATED TESTING OF A NAVIGABLE SIMULATED ENVIRONMENT

(71) Applicant: Microsoft Technology Licensing, LLC, Redmond, WA (US)

(72) Inventors: Guoqing Liu, Beijing (CN); Li Zhao, Beijing (CN); Tao Qin, Beijing (CN); Adrian Lee Brown, Kirkland, WA (US); James Eugene Bischoff, Jr., Redmond, WA (US); Tieyan Liu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 401 days.

(21) Appl. No.: 18/353,327

(22) Filed: Jul. 17, 2023

(65) Prior Publication Data

US 2023/0418433 A1      Dec. 28, 2023

Related U.S. Application Data

(63) Continuation of application No. PCT/CN2022/100505, filed on Jun. 22, 2022.

(51) Int. Cl.
    G06F 11/36          (2025.01)
    G06F 3/04815        (2022.01)
    (Continued)

(52) U.S. Cl.
    CPC ...... G06F 11/3688 (2013.01); G06F 3/04815 (2013.01); G06T 7/70 (2017.01);
    (Continued)

(58) Field of Classification Search
    CPC .... G06F 11/3688; G06F 3/04815; G06T 7/70; G06T 19/003; G06T 2207/20081;
    (Continued)

(56) References Cited

U.S. PATENT DOCUMENTS

2012/0204153 A1      8/2012  Peterson et al.
2013/0263090 A1     10/2013  Polk et al.
(Continued)

OTHER PUBLICATIONS

"Action RPG Game", Retrieved from: https://web.archive.org/web/20211216000939/https://docs.unrealengine.com/4.27/en-US/Resources/SampleGames/ARPG/, Dec. 16, 2021, 3 Pages.
(Continued)

*Primary Examiner* — Neil R Mclean
(74) *Attorney, Agent, or Firm* — Alleman Hall LLP

(57) ABSTRACT

A computing system for pixel-based automated testing of a navigable simulated environment includes one or more processors configured to execute, in a run-time inference phase, an application testing program. The application testing program includes a machine learning model trained to detect errors in the application under test. A screen image of the simulated environment is processed by an object detection module to determine if a key object is present in the screen image. If a key object is present in the screen image, the application testing program executes an object investigation module to generate investigation inputs to investigate the key object. If a key object is not present in the screen image, the application testing program executes an environment exploration module to generate an environment exploration action to be provided to the application under test as simulated user input.

20 Claims, 13 Drawing Sheets

(51) Int. Cl.
    *G06F 11/3668*    (2025.01)
    *G06T 7/70*    (2017.01)
    *G06T 19/00*    (2011.01)
(52) U.S. Cl.
    CPC .. *G06T 19/003* (2013.01); *G06T 2207/20081*
        (2013.01); *G06T 2207/20084* (2013.01)
(58) Field of Classification Search
    CPC .......... G06T 2207/20084; G06N 3/045; G06N
        3/0464; G06N 3/006; G06N 3/084; G06N
        3/088; G06N 3/09; G06N 3/092
    USPC ........................................................ 382/155
    See application file for complete search history.

(56) References Cited

U.S. PATENT DOCUMENTS

2021/0082129 A1*   3/2021   Nazari ................... G06V 20/20
2021/0279167 A1    9/2021   Jose
2021/0346798 A1*  11/2021  Borovikov ............ A63F 13/352

OTHER PUBLICATIONS

"COCO—Common Objects in Context", Retrieved from: https://web.archive.org/web/20220424191044/https:/cocodataset.org/#home, Apr. 24, 2022, 3 Pages.
"Inspector-GameTesting / Inspector-Game Testing", Retrieved from: https://github.com/Inspector-Game Testing/Inspector-GameTesting, Feb. 28, 2022, 1 Page.
"Mojang—MC-16731", Retrieved from: https:/bugs.mojang.com/browse/MC-16731, May 28, 2013, 2 Pages.
"Most Played Games", Retrieved from: https://www.microsoft.com/en-in/store/most-played/games/xbox?rtc=1, Retrieved on: Apr. 27, 2022, 10 Pages.
"Shooter Game", Retrieved from: https://web.archive.org/web/20211231112529/https:/docs.unrealengine.com/4.27/en-US/Resources/SampleGames/ShooterGame/, Dec. 31, 2021, 5 Pages.
"Unreal Engine", Retrieved from: https://www.unrealengine.com/en-US/, Retrieved on: Apr. 27, 2022, 8 Pages.
Aleem, et al., "Critical Success Factors to Improve the Game Development Process from a Developer's Perspective", In Journal of Computer Science and Technology, vol. 31, Sep. 9, 2016, pp. 925-950.
Andrade, et al., "Automatic Computer Game Balancing: A Reinforcement Learning Approach", In Proceedings of The Fourth International Joint Conference on Autonomous Agents and Multiagent Systems, Jul. 25, 2005, pp. 1111-1112.
Ariyurek, et al., "Automated Video Game Testing using Synthetic and Humanlike Agents", In Journal of IEEE Transactions on Games, vol. 13, Issue 1, Mar. 2021, pp. 50-67.
Ariyurek, et al., "Automated Video Game Testing Using Synthetic and Human-Like Agents", In Repository of arXiv:1906.00317v1, Jun. 2, 2019, 21 Pages.
Ariyurek, et al., "Enhancing the Monte Carlo Tree Search Algorithm for Video Game Testing", In Proceedings of the IEEE Conference on Games (CoG), Aug. 24, 2020, pp. 25-32.
Aubret, et al., "A Survey on Intrinsic Motivation in Reinforcement Learning", In Repository of arXiv:1908.06976v1, Aug. 19, 2019, 33 Pages.
Becares, et al., "An Approach to Automated Videogame Beta Testing", In Journal of Entertainment Computing, vol. 18, Aug. 22, 2016, pp. 79-92.
Bellemare, et al., "Unifying Count-Based Exploration and Intrinsic Motivation", In Journal of Advances in Neural Information Processing Systems, vol. 29, Dec. 5, 2016, 9 Pages.
Bergdahl, et al., "Augmenting Automated Game Testing with Deep Reinforcement Learning", In Proceedings of IEEE Conference on Games (CoG), Aug. 24, 2020, pp. 600-603.

Bergdahl, et al., "Augmenting Automated Game Testing with Deep Reinforcement Learning", In Repository of arXiv:2103.15819v1, Mar. 29, 2021, 4 Pages.
Browne, et al., "A Survey of Monte Carlo Tree Search Methods", In Proceedings of IEEE Transactions on Computational Intelligence and AI in Games, vol. 4, Issue 1, Mar. 2012, 43 Pages.
Burda, et al., "Exploration by Random Network Distillation", In Proceedings of 7th International Conference on Learning Representations, May 9, 2019, 17 Pages.
Chang, et al., "Reveal-More: Amplifying Human Effort in Quality Assurance Testing using Automated Exploration", In Proceedings of the IEEE Conference on Games (CoG), Aug. 20, 2019, 8 Pages.
Charoenpitaks, et al., "Curiosity-Driven Exploration Effectiveness on Various Environments", In Proceedings of the 3rd International Conference on Vision, Image and Signal Processing, Aug. 26, 2019, 6 Pages.
Cho, et al., "Scenario-Based Approach for Blackbox Load Testing of Online Game Servers", In Proceedings of International Conference on Cyber-Enabled Distributed Computing and Knowledge Discovery, Oct. 10, 2010, pp. 259-265.
Gisslen, et al., "Adversarial Reinforcement Learning for Procedural Content Generatio", In Proceedings of IEEE Conference on Games, Aug. 17, 2021, 8 Pages.
Gordillo, et al., "Improving Playtesting Coverage via Curiosity Driven Reinforcement Learning Agents", In Proceedings of the IEEE Conference on Games, Aug. 17, 2021, 8 Pages.
Gordillo, et al., "Improving Playtesting Coverage via Curiosity Driven Reinforcement Learning Agents", In Repository of arXiv:2103.13798v2, Jun. 23, 2021, 8 Pages.
Guerrero-Romero, et al., "Using A Team of General AI Algorithms to Assist Game Design and Testing", In Proceedings of IEEE Conference on Computational Intelligence and Games, Aug. 14, 2018, 8 Pages.
He, et al., "Deep Residual Learning for Image Recognition", In Proceedings of the IEEE Conference on Computer Vision and Pattern Recognition, Jun. 27, 2016, pp. 770-778.
Holmgard, et al., "Automated Playtesting with Procedural Personas Through mcts with Evolved Heuristics", In Journal of IEEE Transactions on Games, vol. 11, Issue 4, Feb. 20, 2018, pp. 352-362.
Iftikhar, et al., "An Automated Model Based Testing Approach for Platform Games", In Proceedings of the ACM/IEEE 18th International Conference on Model Driven Engineering Languages and Systems, Sep. 30, 2015, pp. 426-435.
Kingma, et al., "Adam: A Method for Stochastic Optimization", In Proceedings of International Conference on Learning Representations, May 7, 2015, 15 Pages.
Liang, et al., "Proximal Policy Optimization with Elo-based Opponent Selection and Combination with Enhanced Rolling Horizon Evolution Algorithm", In Proceedings of IEEE Conference on Games, Aug. 17, 2021, 4 Pages.
Lin, et al., "Feature Pyramid Networks for Object Detection", In Proceedings of IEEE Conference on Computer Vision and Pattern Recognition, Jul. 21, 2017, pp. 936-944.
Lin, et al., "Studying the Urgent Updates of Popular Games on the Steam Platform", In Journal of Empirical Software Engineering, vol. 22, Issue 4, Aug. 1, 2017, 33 Pages.
Ling, et al., "Using Deep Convolutional Neural Networks to Detect Rendered Glitches in Video Games", In Proceedings of the AAAI Conference on Artificial Intelligence and Interactive Digital Entertainment, vol. 16, Issue 1, Oct. 1, 2020, pp. 66-73.
Mugrai, et al., "Automated Playtesting of Matching Tile Games", In Proceedings of IEEE Conference on Games (CoG), Aug. 20, 2019, 7 Pages.
Noblega, et al., "Towards Adaptive Deep Reinforcement Game Balancing", In Proceedings of 11th International Conference on Agents and Artificial Intelligence, vol. 2, Feb. 19, 2019, pp. 693-700.
Ostrowski, et al., "Automated Regression Testing within Video Game Development", In Proceedings of GSTF Journal on Computing (JoC), vol. 3, Issue 2, Jul. 23, 2013, 5 Pages.
Pathak, et al., "Curiosity-driven Exploration by Self-supervised Prediction", In Proceedings of the 34th International Conference on Machine Learning, Aug. 6, 2017, 12 Pages.

(56)                    References Cited

OTHER PUBLICATIONS

"International Search Report and Written Opinion Issued in PCT Patent Application No. PCT/CN22/100505", Mailed Date: Jan. 5, 2023, 16 Pages.

Pfau, et al., "Automated Game Testing with Icarus: Intelligent Completion of Adventure Riddles Via Unsupervised Solving", In Proceedings of Extended Abstracts Publication of the Annual Symposium on Computer-Human Interaction in Play (CHI Play), Oct. 15, 2017, pp. 153-163.

Zheng, et al., "Wuji: Automatic Online Combat Game Testing using Evolutionary Deep Reinforcement Learning", In Proceedings of 34th IEEE/ACM International Conference on Automated Software Engineering, Nov. 11, 2019, pp. 772-784.

Politowski, et al., "A Survey of Video Game Testing", In Repository of arXiv:2103.06431v1, Mar. 11, 2021, 10 Pages.

Pomerleau, Deana. , "Efficient Training of Artificial Neural Networks for Autonomous Navigation", In Journal of Neural Computation, vol. 3, Issue 1, Mar. 1, 1991, pp. 1-10.

Qiu, et al., "Unrealcv", Retrieved from: https://github.com/unrealcv/unrealcv, Jul. 15, 2019, 3 Pages.

Ren, et al., "Faster R-CNN: Towards Real-Time Object Detection with Region Proposal Networks", In Journal of Advances in Neural Information Processing Systems, vol. 28, Dec. 7, 2015, 9 Pages.

Santos, et al., "Computer Games Are Serious Business and So is Their Quality: Particularities of Software Testing in Game Development from the Perspective of Practitioners", In Repository of arXiv:1812.05164v1, Dec. 12, 2018, 13 Pages.

Schulman, et al., "Proximal Policy Optimization Algorithms", In Repository of arXiv:1707.06347v1, Jul. 20, 2017, 12 Pages.

Sestini, et al., "CCPT Automatic Gameplay Testing and Validation with Curiosity-Conditioned Proximal Trajectories", In Repository of arXiv:2202.10057v1, Feb. 21, 2022, 11 Pages.

Shao, et al., "A Survey of Deep Reinforcement Learning in Video Games", In Repository of arXiv:1912.10944v1, Dec. 23, 2019, 13 Pages.

Sun, et al., "You May Not Need Ratio Clipping in PPO", In Repository of arXiv:2202.00079v1, Jan. 31, 2022, 18 Pages.

Wang, et al., "Frustratingly Simple Few-Shot Object Detection", In Proceedings of the 37th International Conference on Machine Learning, Jul. 13, 2020, 10 Pages.

Zhan, et al., "Taking the Scenic Route: Automatic Exploration for Videogames", In Proceedings of 2nd Workshop on Knowledge Extraction from Games co-located with 33rd (AAAI) Conference on Artificial Intelligence, vol. 2313, Jan. 27, 2019, 9 Pages.

Zhao, et al., "Winning Is Not Everything: Enhancing Game Development with Intelligent Agents", In Journal of IEEE Transactions on Games, vol. 12, Issue 2, Jun. 2020, pp. 199-212.

* cited by examiner

FIG. 5

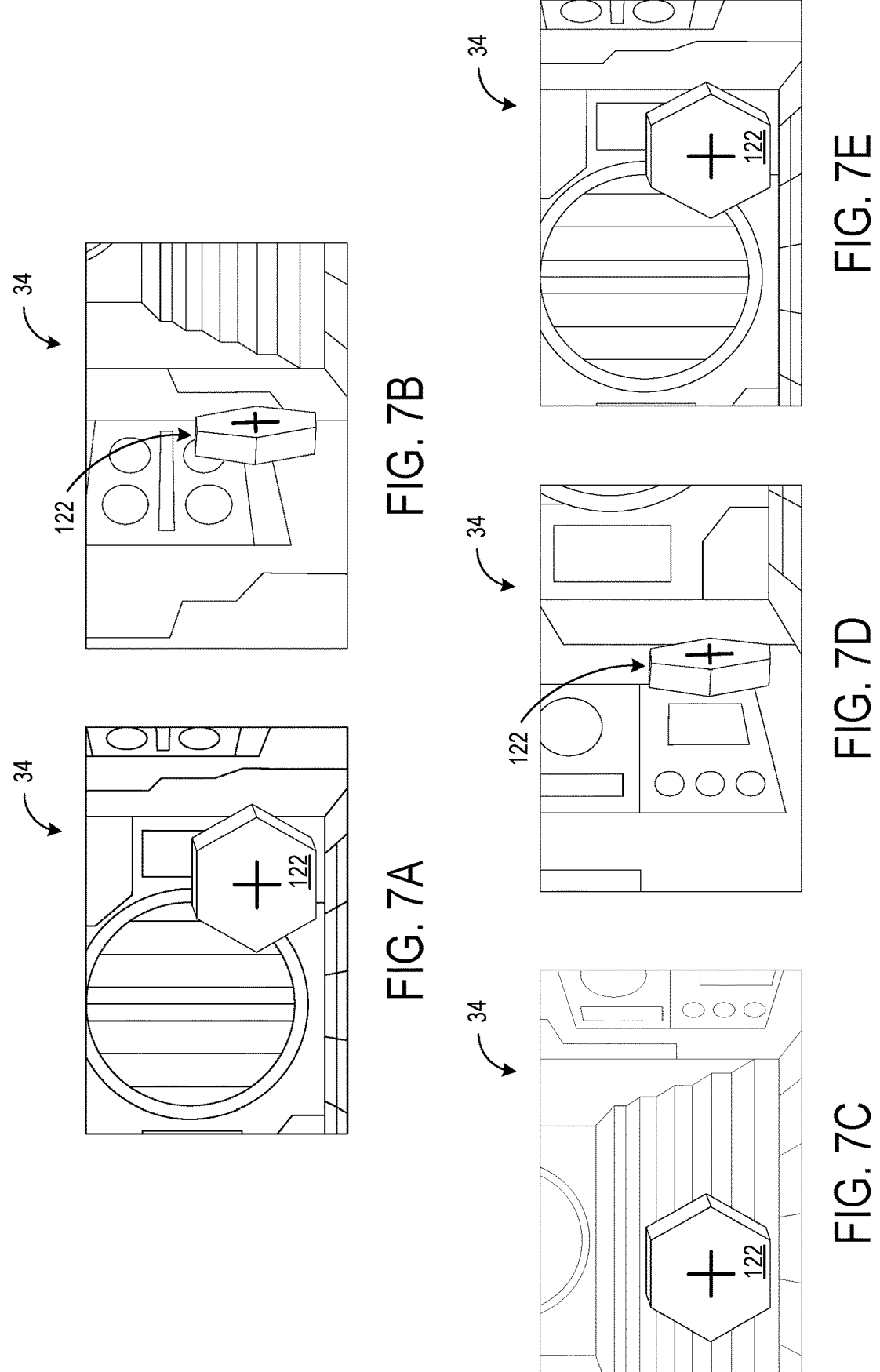

Figure 10:
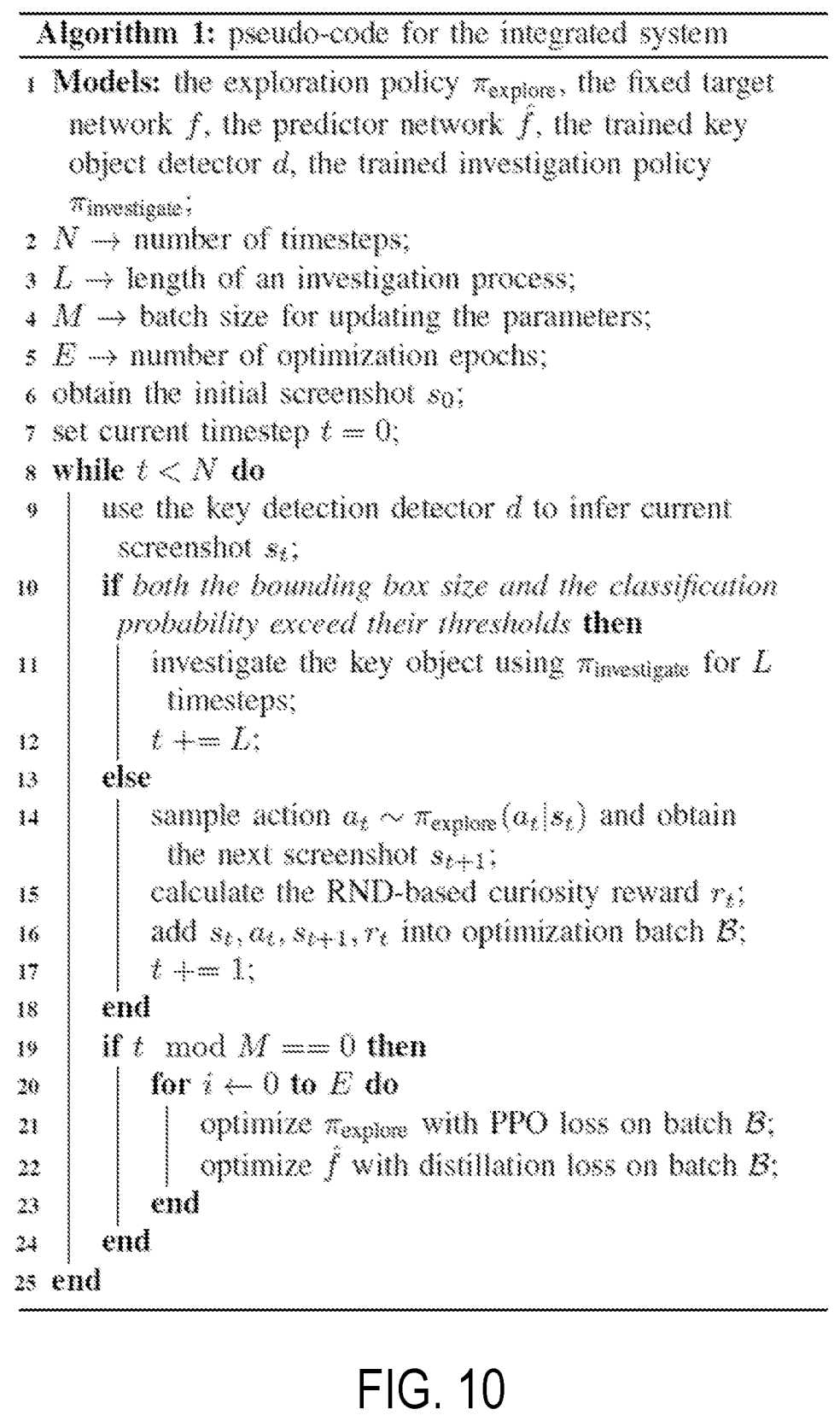

---
Algorithm 1: pseudo-code for the integrated system
---

1 Models: the exploration policy $\pi_{explore}$, the fixed target network $f$, the predictor network $\hat{f}$, the trained key object detector $d$, the trained investigation policy $\pi_{investigate}$;

2 $N \rightarrow$ number of timesteps;

3 $L \rightarrow$ length of an investigation process;

4 $M \rightarrow$ batch size for updating the parameters;

5 $E \rightarrow$ number of optimization epochs;

6 obtain the initial screenshot $s_0$;

7 set current timestep $t = 0$;

8 while $t < N$ do

9      use the key detection detector $d$ to infer current screenshot $s_t$;

10      if *both the bounding box size and the classification probability exceed their thresholds* then

11          investigate the key object using $\pi_{investigate}$ for $L$ timesteps;

12          $t += L$;

13      else

14          sample action $a_t \sim \pi_{explore}(a_t|s_t)$ and obtain the next screenshot $s_{t+1}$;

15          calculate the RND-based curiosity reward $r_t$;

16          add $s_t, a_t, s_{t+1}, r_t$ into optimization batch $B$;

17          $t += 1$;

18      end

19      if $t \mod M == 0$ then

20          for $i \leftarrow 0$ to $E$ do

21              optimize $\pi_{explore}$ with PPO loss on batch $B$;

22              optimize $\hat{f}$ with distillation loss on batch $B$;

23          end

24      end

25 end

PIXEL-BASED AUTOMATED TESTING OF A NAVIGABLE SIMULATED ENVIRONMENT

CROSS REFERENCE TO RELATED APPLICATIONS

This application is a continuation of International Patent Application Serial Number PCT/CN2022/100505, filed Jun. 22, 2022, the entirety of which is hereby incorporated herein by reference for all purposes.

BACKGROUND

Developing computer programs that feature virtual environments that are navigated by users, such as virtual reality environments, computer game environments, simulator environments, and the like, requires extensive testing to ensure all the content is free of bugs, glitches, and other errors. Testing such programs for quality assurance typically requires human testers and/or human-written scripts for testing, and relies on internal state information of the program. As technological advancements in program development lead to increases in size and complexity of these programs and their virtual environments, thorough testing of such programs is becoming progressively complex and time consuming.

SUMMARY

In view of these issues, a computing system for pixel-based automated testing of a navigable simulated environment generated by an application under test is provided. The computing system has server-side and client-side aspects. According to one aspect, the computer system includes one or more processors configured to execute instructions using portions of associated memory to implement, in a run-time inference phase, an application testing program. The application testing program includes a machine learning model trained to predict errors in the application under test. The application testing program is configured to receive a screen image of the navigable simulated environment generated by the application under test, and process the screen image using an object detection module to thereby determine if a key object is present in the screen image. If a key object is determined to be present in the screen image, the application testing program is configured to execute an object investigation module that receives an image of the detected key object, and generates investigation inputs to investigate the key object. If a key object is not determined to be present in the screen image, the application testing program is configured to execute an environment exploration module that receives the screen image as input, and processes the screen image to generate an environment exploration action to be provided to the application under test as simulated user input.

In some configurations, the object detection module includes an object detection neural network for detecting key objects in the application under test. The object detection neural network is trained during an initial training phase with first training data derived from a common objects in context data set, and the object detection neural network is subsequently trained with a second training data set including labeled screen images of key objects in the application under test.

In some configurations, the object investigation module includes an object investigation neural network that is trained with investigation inputs from human testers investigating key objects during human game testing sessions.

In some configurations, the environment exploration module includes a target neural network and a predictor neural network. The screen image is input to the target neural network and the predictor neural network during an exploration phase, and each of the target neural network and the predictor neural network map the screen image to a respective embedding vector. The target neural network is randomly initialized and fixed, and an output embedding vector of the target neural network during the exploration phase is set as ground truth for the predictor neural network. The predictor neural network outputs a predicted embedding vector and is trained using a distillation loss function to minimize a prediction error between the output embedding vector of the target network and the predicted embedding vector. The environment exploration module further includes an exploration policy neural network that is configured to predict the environment exploration action in response to receiving the screen image as input that will result in a greatest expected reward.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 is a schematic diagram of a curiosity-driven environment exploration module of the computing system of FIG. 1 during an exploration phase.

FIGS. 7A to 7E illustrate investigation of a key object in the navigable simulated environment using the computing system of FIG. 1.

FIG. 10 illustrates pseudo-code for an algorithm implemented by the system of FIG. 1.

DETAILED DESCRIPTION

Testing computer programs that feature virtual environments that are navigated by users, such as virtual reality environments, computer game environments, simulator environments, and the like, involves exploration of the environment, as well as identification of objects within the environment and investigation of the identified objects. Inadequate testing may result in release of a computer program that has bugs, glitches, and other errors, which may lead to a subpar program performance, a frustrating user experience, urgent recall or update of the computer program, and consumption of computer and human resources to fix the problems. Testing by human users can minimize the presence of bugs, glitches, and other errors in the computer program; however, human testing is typically costly and time-consuming. Further, as computer programs become larger and more complex, adequate testing with human users becomes less feasible.

Automated computer program testing, such as with deep reinforcement learning (DRL) algorithms can be performed as an alternative to human testing. However, testing with a DRL algorithm typically relies on internal state information, which requires deep integration with source code and thus access to source code. Such deep integration with the source code limits the application of testing algorithms to only computer programs with source code available. Further, even when accessible, source code changes frequently during computer program development, thereby creating a challenge for developers to maintain deep integration of a testing algorithm.

Figure 1:
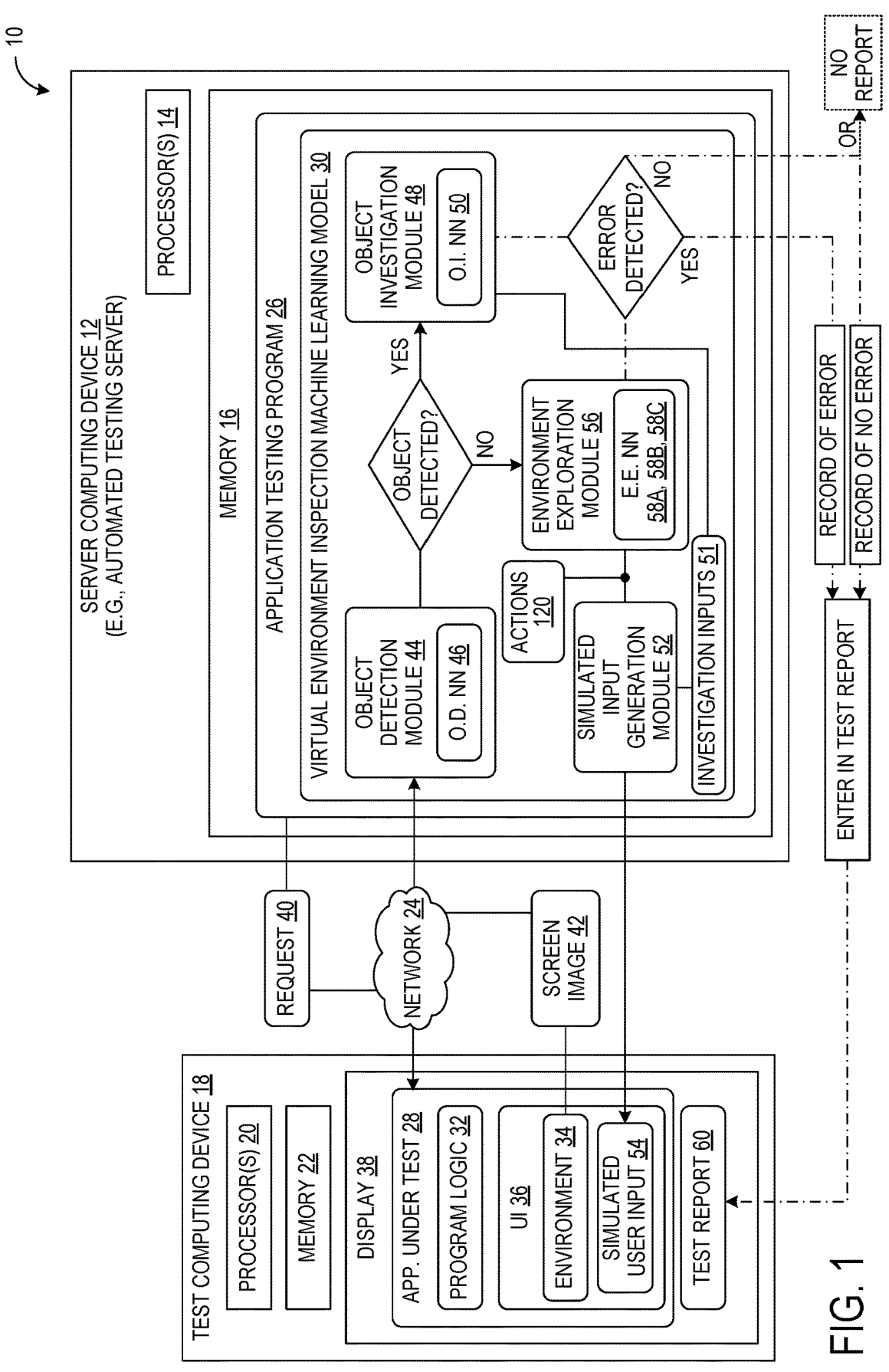
FIG. 1 is a general schematic diagram of a computing system for pixel-based automated testing of a navigable simulated environment generated by an application under test, according to an embodiment of the present disclosure.

As schematically illustrated in FIG. 1, to address the above identified issues, a computing system 10 for pixel-based automated testing of a navigable simulated environment generated by an application under test is provided. The computing system 10 is illustrated as comprising a first computing device 12 including one or more processors 14 and memory 16, and a second computing device 18 including one or more processors 20 and memory 22, with the first and second computing devices 12, 18 being in communication with one another via a network 24. The illustrated implementation is exemplary in nature, and other configurations are possible. In the description of FIG. 1 below, the first computing device will be described as a server computing device 12 and the second computing device will be described as a test computing device 18, and respective functions carried out at each device will be described. It will be appreciated that in other configurations, the first computing device could be a computing device other than server computing device 12. In some configurations, the computing system 10 may include a single computing device that carries out the salient functions of both the server computing device 12 and test computing device 18. In other alternative configurations, functions described as being carried out at the test computing device 18 may alternatively be carried out at the server computing device 12 and vice versa.

Continuing with FIG. 1, the server computing device 12 may, for example, take the form of an automated testing server hosted in a data center of an application testing platform operator, for example. Alternatively, the server computing device 12 may be configured by the application testing platform operator to be hosted at a client-specified data center under control of the client, for performance, security, privacy, and/or export compliance reasons, for example. As discussed above, the server computing device 10 includes one or more processors 12 and associated memory 14. The one or more processors 12 are configured to execute instructions using portions of the associated memory 14 to implement, during an inference-time phase, an application testing program 26 including an artificial intelligence (AI) model that explores the navigable simulated environment, detects and investigates objects within the navigable simulated environment, and detects errors in an application under test (AUT) 28 that produces the virtual environment.

In the embodiments described herein, the AI model is a machine learning (ML) model is referred to as a virtual environment inspection ML model 30, and the AUT 28 is a computer gaming application. However, it will be appreciated that ML model may be implemented as a pixel-based testing model for testing any type of computer application that is compatible with pixel-based automated testing. Likewise, the AUT 28 may be any type of computer application having a navigable simulated environment that is suitable for pixel-based automated testing, such as a computer game, virtual reality program, or three dimensional simulation program (e.g., flight simulator, machinery simulator, etc.). Additionally, when the AUT 28 is configured as a game, it may be configured as a single-player or multiplayer game, for the purpose of simplicity, the computer gaming application discussed herein is described as a single-player game.

The AUT 28 may include program logic 32 configured to be executed by the one or more processors 20 using associated memory 22 to implement the functions of the AUT 28 described herein. A navigable simulated environment 34 of the AUT 28 may be displayed in a user interface (UI) 36 on a display 38 of the test computing device 18. The navigable simulated environment 34 may be three dimensional or two dimensional, and may be displayed from the perspective of a first person user, or from another perspective, for example. During testing, the application testing program 26 may receive from the AUT 28 a screen image 42 (i.e., screenshot) of the navigable simulated environment 34 (e.g., game space in the case of a computer game), which was computed by the program logic 32, based on the simulated user input 54. In some implementations, the application testing program 26 may send a request 40 to the AUT 28 for the screen image 42. Notably, the application testing program 26 typically receives only screen images 42 as input from the AUT 28 for use in controlling the application testing program 26 to explore the navigable simulated environment 34, and is thus configured to be executed independently of an internal state of the AUT 28. It will be appreciated that the screen images 42 may be processed to yield pixelwise rendered image data by the application testing program 26.

The screen image 42 is processed using an object detection module 44 included in the virtual environment inspection ML model 30. As described in detail below with reference to FIGS. 3A to 3D, the object detection module 44 includes an anchor-based object detection neural network (NN) 46 that is configured to determine whether a key object is present in the screen image 42. If a key object is present, the object detection NN 46 determines a type and position of the key object, and the virtual environment inspection ML model 30 executes an object investigation module 48 that receives an image of the detected key object. The object investigation module 48 includes an object investigation NN 50 that is configured to investigate the key object by predicting a series of investigation inputs 51 to be made in response to screen image 42 inputs. The object investigation NN 50 is trained with a training data set including pairs of screen images 42 and ground truth investigation inputs made by human software testers during testing. Thus, the object investigation NN learns to mimic human testers, based on screen image data. The investigation inputs may be, for example, a series of keystrokes, game controller inputs, mouse clicks, touch screen touches, touch pad touches, etc.

A simulated input generation module 52 receives one or more predicted investigation inputs 51 from the object investigation module 48 in response to its processing of screen image 42. The simulated input generation module 52 generates simulated user input 54 according to the one or more predicted investigation inputs 51, and sends the simulated user input 54 to the test computing device 18. The simulated user input may be, for example, application program interface (API) calls, Bluetooth commands, or commands sent via another software or hardware interface that mimic actual user inputs from a real user input device, even though no real user input device is connected during the testing. In this way, the simulated user input 54 can provide commands that implement the predicted investigation inputs 51 to the AUT 28. The simulated user input 54 causes the program logic 32 of the AUT 28 to update the navigable simulated environment 34 of the UI 36, which results in an updated screen image 42 being outputted. The simulated user input 54 may include actions a player may take in a computer game, such as move forward, move backward, move left, move right, turn left, turn right, and jump, for example. The simulated user input 54 may be in the form of, for example, keyboard commands, game controller commands, mouse clicks, touchscreen inputs, touch pad inputs, etc., provided by a hardware or software interface as described above.

When a key object is not determined to be present in the screen image 42, or when the object investigation is complete, the virtual environment inspection ML model 30 is configured to execute an environment exploration module 56. The environment exploration module 56 includes three environment exploration NN 58A, 58B, 58C that are configured to process the screen image 42 to predict whether the screen shot 42 has been previously seen, and to predict environment exploration actions. The environment exploration module 56 includes a reward function that rewards actions that result in unfamiliar screen images being displayed. As such, the environment exploration module 56 is motivated to predict environment exploration actions to explore novel areas in the game space that have not yet been frequently explored during the testing. These predicted environment exploration actions may be received by the simulated input generation module 52, which generates at least one exploration action to be provided to the AUT 28 as simulated user input 54. The simulated user input 54 is sent to the AUT 28 and causes the environment 34 to be updated by the program logic 32 in the UI 36 of the AUT 28.

If an error is discovered in the simulated navigable environment while investigating the key object and/or exploring the navigable simulated environment, the object investigation module 48 and/or the environment exploration module 56 may transmit a record of the error to be entered in a test report 60, including the location within the environment, any key object involved, and the type of error detected. The test report 60 may be transmitted to the test computing device 18 as shown, or to another storage location. If no error is detected, the application testing program 26 may be configured to transmit a record that no error was detected for the location within the environment, to be included in test report 60. Alternatively, if no error is detected, the application testing program 26 may simply not transmit any record to include in the test report for the location, resulting in a test report that contains only errors. The test report 60 may be reviewed by game developers during testing to determine locations and key objects within the navigable environment that have errors, as well as corresponding areas in which the game source code requires attention and repair.

Figure 2:
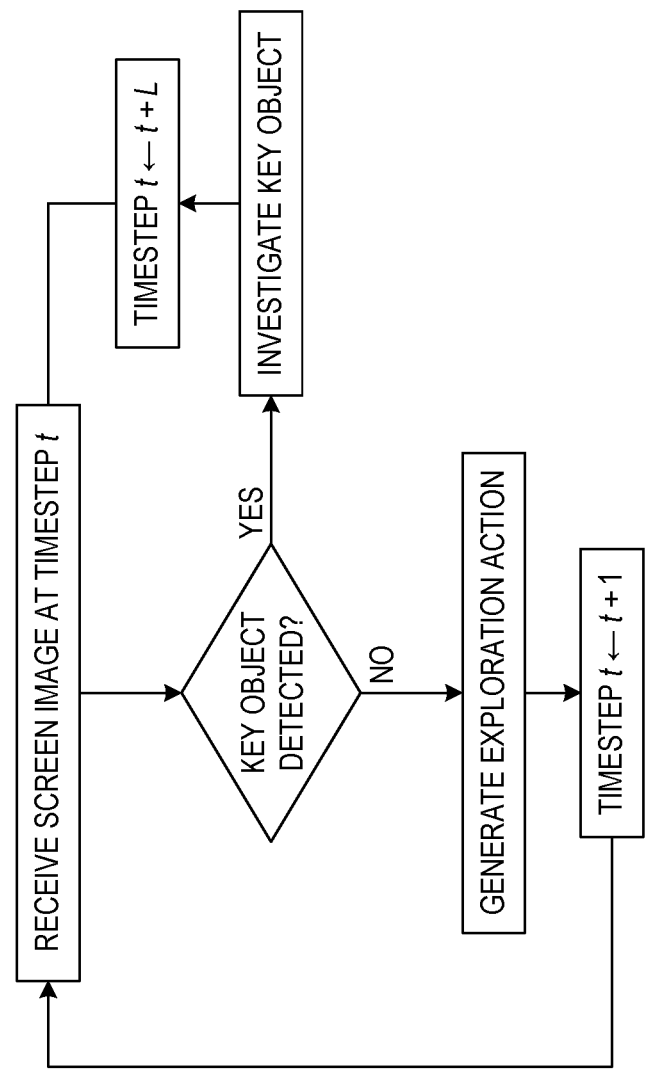
FIG. 2 is a diagram of a decision flow for pixel-based automated testing using the computing system of FIG. 1.

FIG. 2 is a diagram of a decision flow for pixel-based automated testing using the application testing program 26. Together, the object detection module 44, the object investigation module 48, and the environment exploration module 56 comprise an integrated system for testing applications under test. As shown in the decision flow, at each timestep t, the object detection module 44 detects whether there exists a key object in the screen image 42. If not, the environment exploration module 56 will be executed to explore the navigable simulated environment 34 through simulated user input 54 simulating user actions. If the key object is detected, the object investigation module 48 is executed, and simulated user input 54 according to a series of actions is performed to investigate the key object. When the investigation is complete, exploration of the navigable simulated environment will continue via the environment exploration module 56 until a key object is discovered.

An important aspect of game testing is to interact with key objects in the game space, as some hidden and difficult-to-find bugs are only detected via player interaction with key objects. However, recognizing and identifying key objects in the game space can present a challenge. To detect key objects and better expose the potential errors associated with interacting with key objects, the application testing program 26 includes the object detection NN 46 and the object investigation neural NN 50.

Figure 3A:
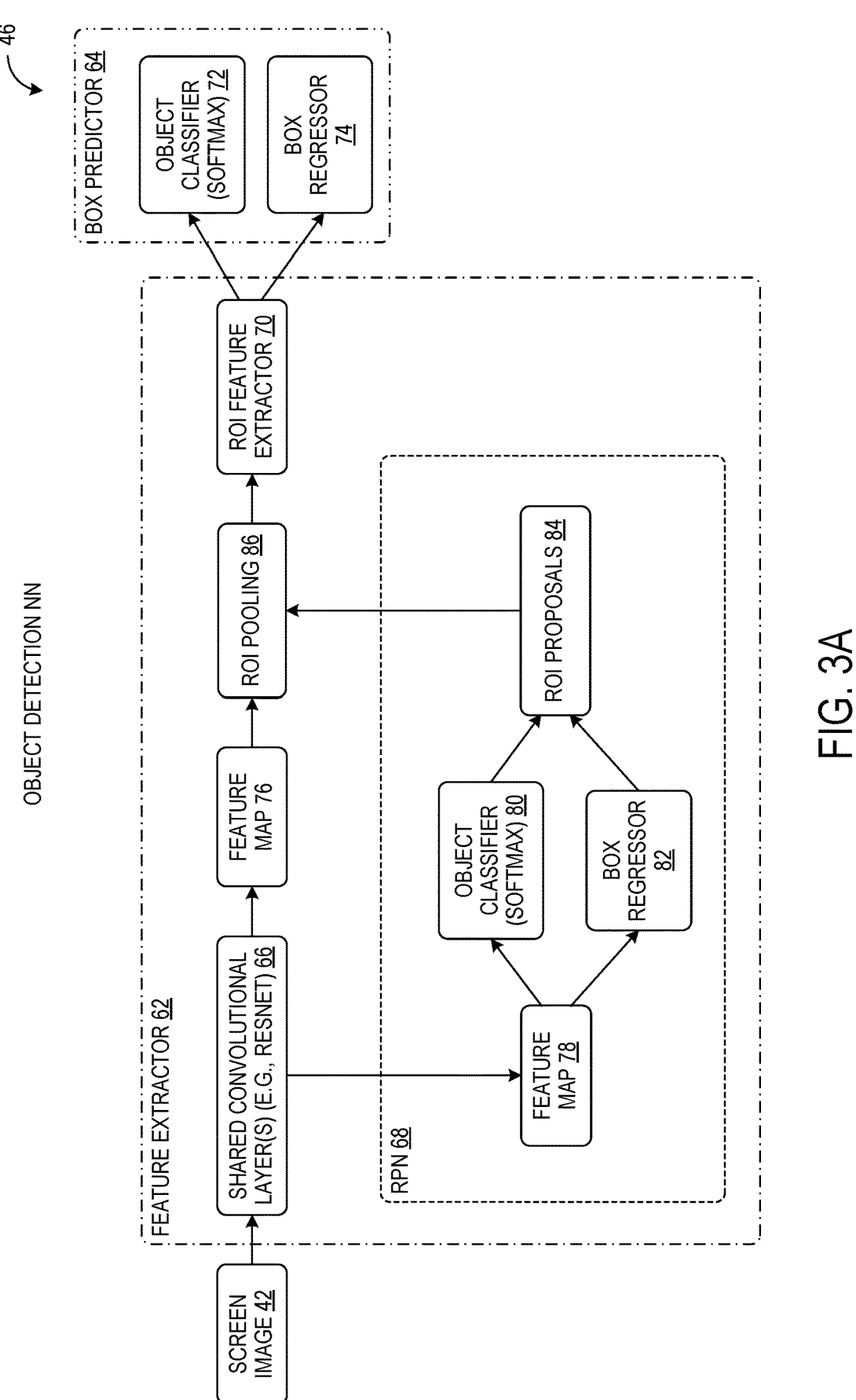
FIG. 3A is a schematic diagram of an object detection neural network of the computing system of FIG. 1.

A schematic diagram of the anchor-based object detection NN 46 is shown in FIG. 3A. As illustrated, the object detection NN 46 is configured as a Faster Region-based Convolutional Neural Network (R-CNN), which comprises a feature extractor 62 and a box predictor 64, as indicated by the dashed-dot and dashed-dot-dot lines, respectively. The feature extractor 62 includes one or more shared convolutional layers (e.g., ResNet) 66, a region proposal network (RPN) 68, and Region of Interest (RoI) feature extractor 70. The box predictor 64 includes an object classifier (e.g., SoftMax) 72 to classify detected key objects to categories, and a box regressor 74 to predict bounding box coordinates for a key object. When an image, such as a screen image 42, is input to the object detection NN 46, it is filtered via the shared convolutional layers 66, and two feature maps 76, 78 are generated. In the RPN 68, the feature map 78 is processed via both an object classifier (e.g., SoftMax) 80 and a box regressor 82 to produce RoI proposals 84 that predict positions of key objects within the screen image 42. The RoI proposals 84 from the RPN 68 are pooled with the fixed feature map 76 in an RoI pooling layer 86. The RoI feature extractor 70 extracts features (i.e., objects) from the predicted regions of interest, and bounding boxes with anchor points and a predicted classification for each object detected in the screen image 42 are output via the box predictor 64.

Figures 3B, 3C:
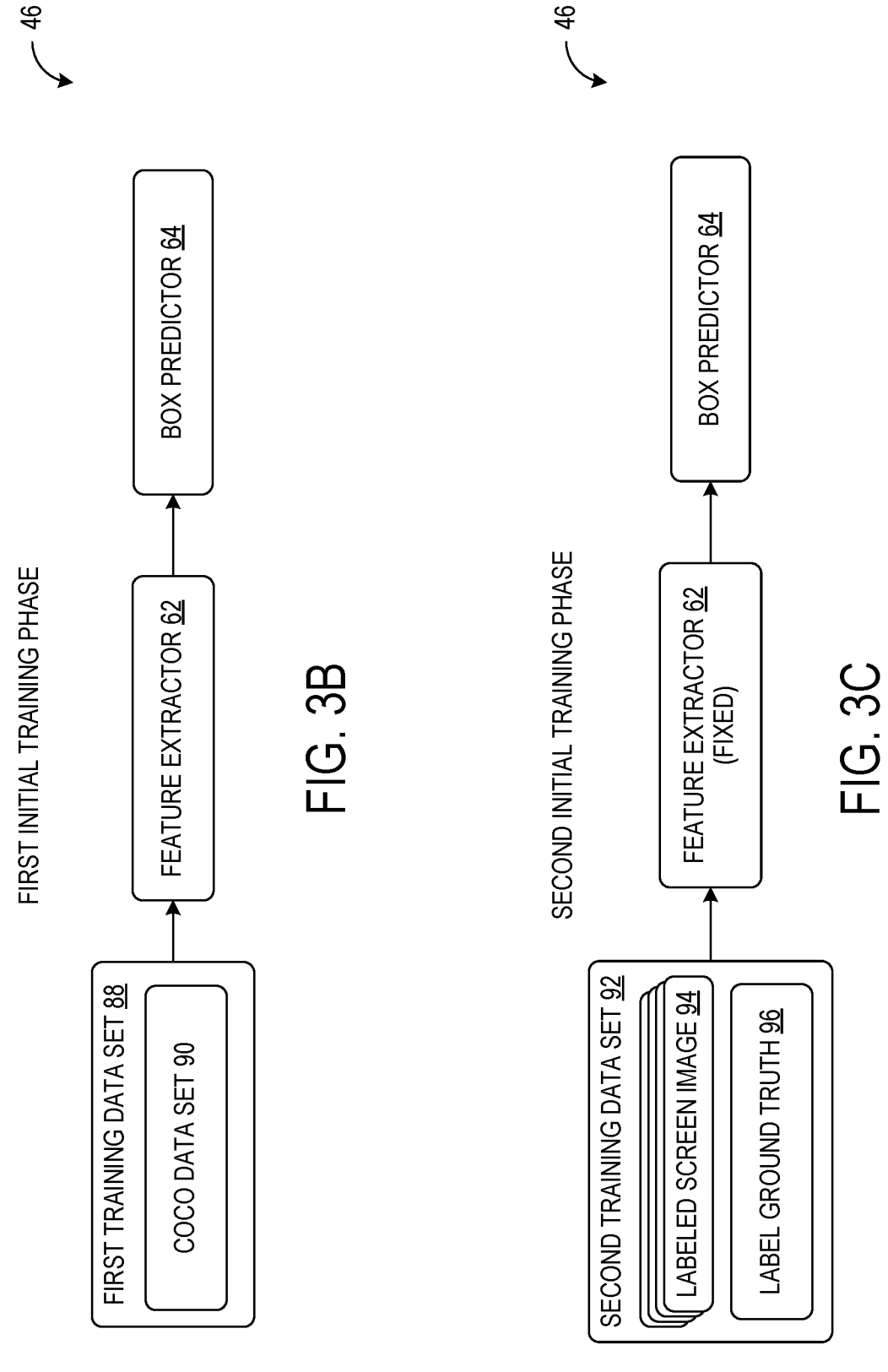
FIGS. 3B and 3C are schematic diagrams of an object detection neural network of the computing system of FIG. 1 during an initial training phase.

To minimize cost and time typically associated with manually labeling a large number of screen images, the initial training phase for the object NN 46 is implemented as a two-stage fine-tuning method for few-shot object identification. As shown in FIG. 3B, the object detection NN 46 is trained during a first initial training phase with a first training data set 88 derived from a Common Objects in Context (COCO) data set 90, which is a large-scale object detection, segmentation, and captioning data set that includes over 200,000 labeled images and multiple captions for each image. Alternatively, another data set showing common objects in their contextual surroundings could be used besides COCO. The object detection NN 46 is then trained during a second initial training phase with a second training data set 92, as shown in FIG. 3C. The second data set 92 includes labeled screen images 94 for each type of key object in the AUT 28, as well as ground truth 96 for the key objects in respective screen images. In the second initial training phase, the feature extractor 62 is fixed, and features learned from the base classes during the first initial training phase using the COCO data set 88 are applied to the new class of key objects in the AUT 28.

Figure 3D:
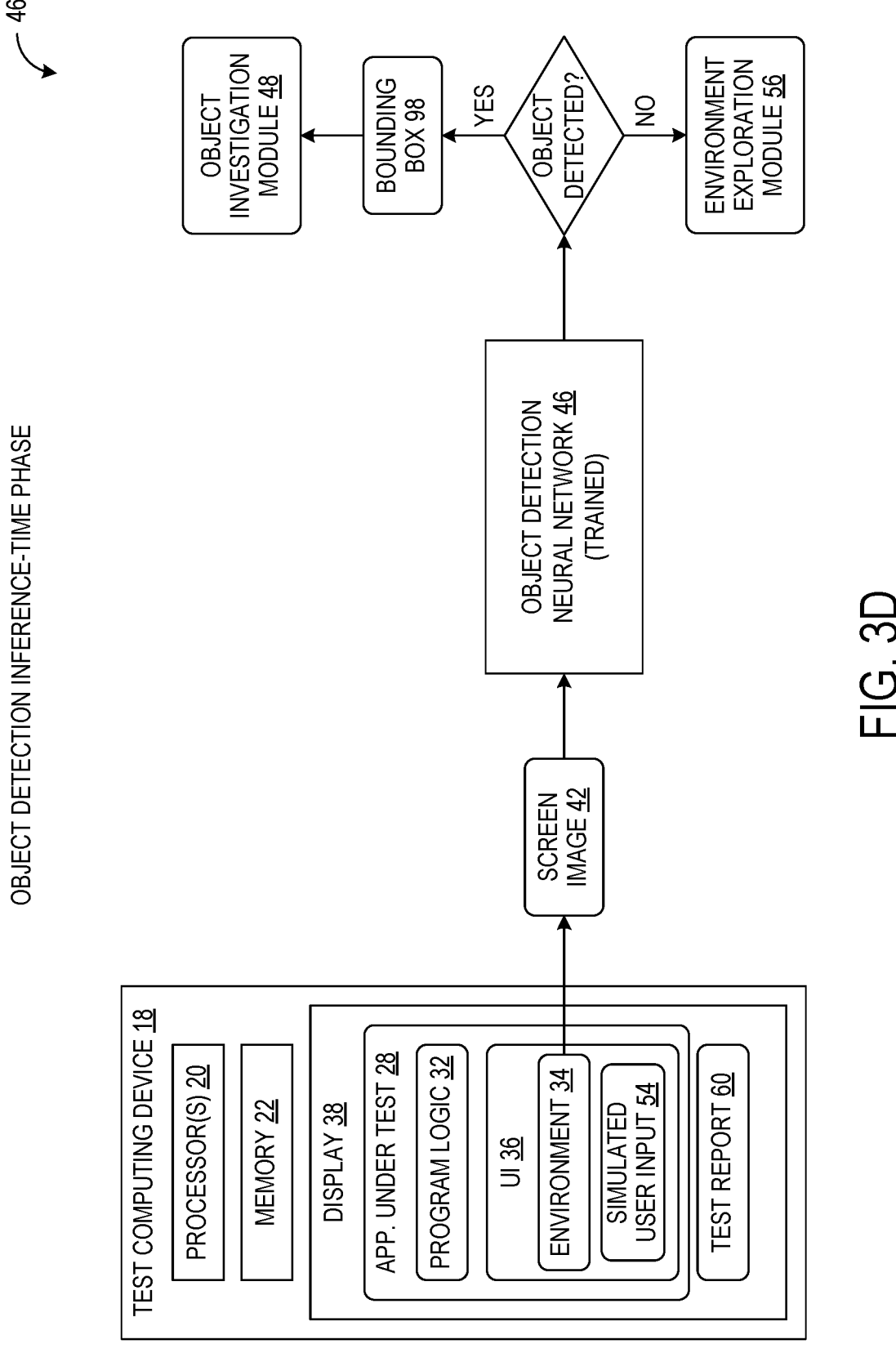
FIG. 3D is a schematic diagram of an object detection neural network of the computing system of FIG. 1 during an inference-time phase.

FIG. 3D is a schematic diagram of the object detection NN 46 during an inference-time phase. As illustrated and described above, the object detection NN 46 is configured to receive the screen image 42 of the navigable simulated environment 34 as input from the test computing device 18. If a key object is detected in the screen image 42, the object detection NN 46 outputs image data for the identified key object within bounding box coordinates 98 predicted by the box regressor 74, and the object investigation module 48 is triggered to investigate the key object, as described in detail below with reference to FIGS. 4A and 4B. If a key object is not detected in the screen image 42, the environment exploration module 56 is triggered to explore the navigable simulated environment 34, as described in detail below with reference to FIG. 5.

Figure 4A:
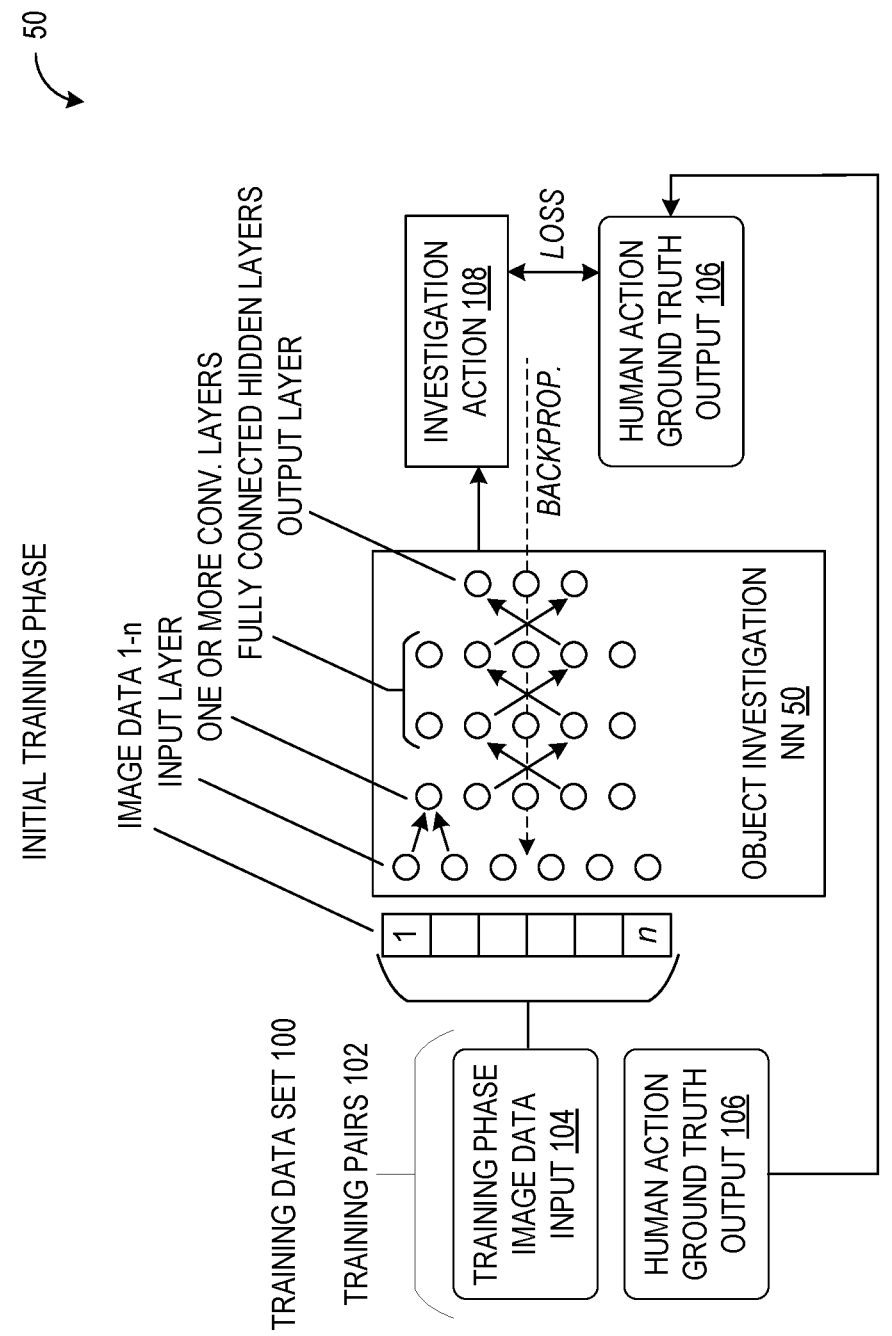
FIG. 4A is a schematic diagram of an object investigation neural network of the computing system of FIG. 1 during an initial training phase.

A schematic diagram of the object investigation NN 50 during an initial training phase is shown in FIG. 4A. In automated game testing, it is important that the application testing program 26 interact with key objects in the game space in a human-like manner, with the anticipation that different types of objects are investigated in different ways by various players. To this end, the object investigation NN 50 is trained for each type of key object in the AUT 28 with a training data set 100 that includes training pairs 102 of pixelwise rendered image data of a key object in the navigable simulated environment 34 as input 104 and human tester actions made in response to said image data as ground truth 106. As shown, the object investigation NN 50 may be configured as a convolutional neural network (CNN) with an input layer, one or more convolutional layers, one or more fully connected hidden layers, and an output layer. It will be appreciated that the object investigation NN 50 may be configured to include one or more convolutional layers, one or more fully connected hidden layers, or both one or more convolutional layers and one or more fully connected hidden layers. The input layer comprises a plurality of nodes corresponding to the training phase image data input 104, which includes one or more key objects and associated bounding box coordinates 98 derived from the object detection NN 46. The output layer includes a plurality of output nodes corresponding to the ground truth output 106, which indicates human actions performed by human testers of the AUT 28 while interacting with the key object. Nodes in each layer are linked by weighted associations, and the object investigation NN 50 is configured to adjust internal weights to enhance the image data of one or more of the key objects and associated bounding box coordinates 98 via a back-propagation algorithm according to a loss function during training to minimize behavior cloning loss and increase the accuracy of the output nodes during an inference-time phase. Once trained, the object investigation NN 50 is enabled to interact with and investigate key objects to expose potential bugs in the AUT 28 in a human-like manner. It will be appreciated that the proximity of the key object to the simulated player can be determined by the size of the bounding box associated with the key object from the object detection NN 46.

Figure 4B:
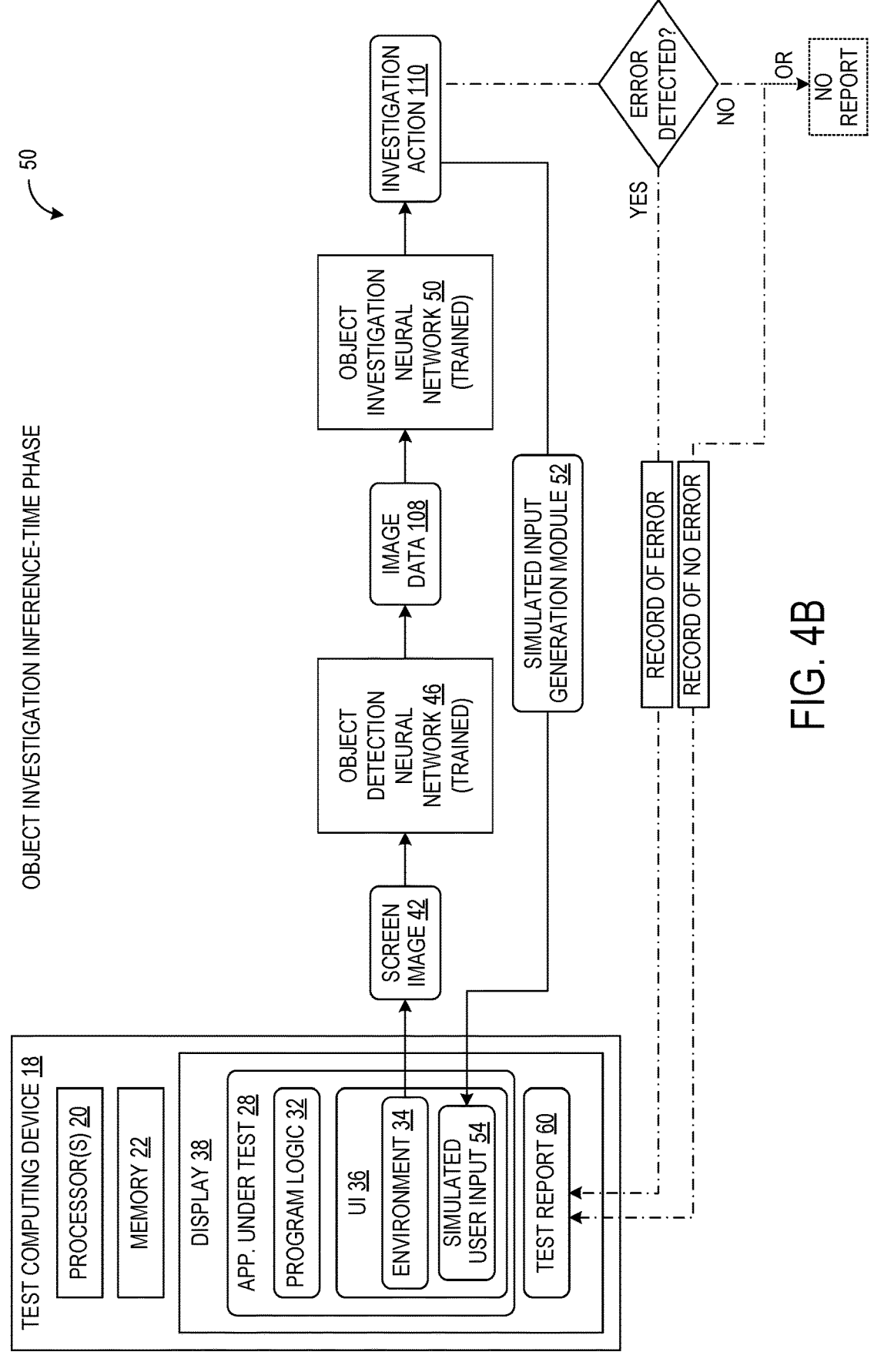
FIG. 4B is a schematic diagram of an object investigation neural network of the computing system of FIG. 1 during an inference-time phase.

FIG. 4B is a schematic diagram of the object investigation NN 50 during an inference-time phase. The object detection NN 46 is included in FIG. 4B to illustrate the coordination of the object detection and object investigation modules 44, 48 in the virtual environment inspection ML model 30 of the application testing program 26. As described above, the object detection NN 46 is configured to process the screen image 42 and output image data for the identified key object within bounding box coordinates 98. The image data 108 is received as input by the object investigation NN 50, which outputs at least one predicted human-like investigation action 110. As described above with reference to FIG. 1, the simulated input generation module 52 receives the at least one predicted investigation action 110 from the object investigation module 48, generates simulated user input 54 according to the at least one predicted investigation action 110, and sends the test input 54 to the test computing device 18, where the one or more actions are performed via the UI 36 of the AUT 28. Also as described above, if an error is discovered while investigating the key object, the object investigation module 48 may transmit the error to the AUT 28, where it is entered in a test report 60.

If a key object is not detected in the screen image 42, then the environment exploration module 56 is triggered to explore the navigable simulated environment 34. In game testing, it is crucial that the entire game space be explored, and preferable that it is explored efficiently without revisiting previously explored environments unnecessarily. As described above, the environment exploration module 56 includes three NN 58A, 58B, 58C, which coordinate to drive exploration of novel areas in the navigable simulated environment 34.

Figure 5:
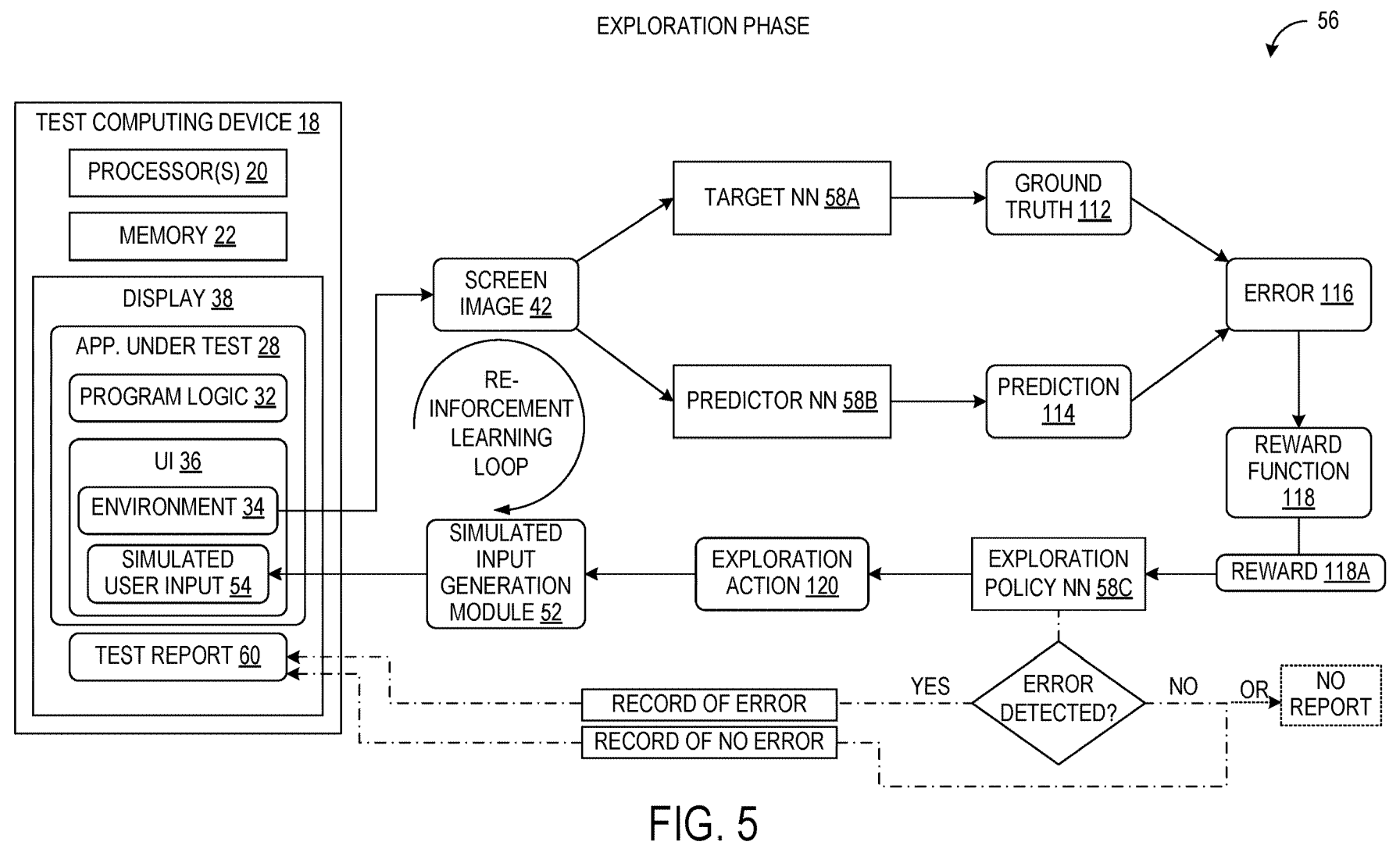

FIG. 5 illustrates the environment exploration module 56 during an exploration phase. As shown in detail in FIG. 5, the first two neural networks included in the environment exploration module 56 are a target NN 58A and a predictor NN 58B, which are applied using a random network distillation (RND) approach and comprise a curiosity-driven reward function that rewards exploration of unfamiliar screen images 42. Both the target NN 58A and the predictor NN 58B may comprise three convolution layers and three fully connected layers. Alternatively, one or both of the target NN 58A and the predictor NN 58B may comprise more or fewer than three convolution layers and three fully connected layers.

The target NN 58A is a randomly initialized and fixed network in which values of weights for different connections between layers are randomly assigned to increase the entropy of the target NN 58A, and thus the learning efficiency. The values of the weights are fixed during the testing process.

The predictor NN 58B is trained on screen images seen during exploration of the navigable simulated environment 34, during the exploration phase. During exploration of the navigable simulated environment 34, at each timestep, a screen image for that timestep is input to the target NN 58A and the predictor NN 58B, which are configured to map each screen image to a respective embedding vector. As illustrated in FIG. 5, the target NN 58A outputs a ground truth 112 (in the form of a ground truth embedding vector, for example) for the predictor NN 58A, which outputs a prediction value 114 (in the form of a predicted embedding vector, for example) for whether the screen image has been seen before. To train the predictor NN 58B, a prediction loss is computed. The prediction loss may be computed using a loss function such as a distillation loss function. For example, the predictor NN 58B may be trained using a distillation loss function to minimize a prediction error 116 between the output embedding vector of the target network and the predicted embedding vector. In one example, predictor NN 58B may be trained to minimize the mean square error between the ground truth 112 and the prediction value 114, as the prediction error 116. It will be appreciated that if a screen image 42 has been seen previously, the prediction error 116 will be low, and a reward 118A from the RND-based curiosity-driven reward function 118 will also be low. As such, the environment exploration module 56 is motivated to explore novel screen images 42 of the navigable simulated environment 34.

The third neural network included in the environment exploration module 56 is an exploration policy NN 58C, which is trained via a Proximal Policy Optimization (PPO) algorithm to receive the reward 118A and output at least one predicted human-like environment exploration action 120 to explore the navigable simulated environment 34, thereby enabling capture of novel screen images 42. Once trained, the exploration policy NN 58C is configured to predict an environment exploration action in response to receiving the screen image as input that will result in a greatest expected reward from the reward function 118. As described above with reference to FIG. 1, the at least one predicted environment exploration action 120 is received by the simulated input generation module 52. The simulated input generation module 52 generates simulated user input 54 according to the at least one predicted exploration action 120, and sends the simulated user input 54 to the test computing device 18, where the simulated user inputs cause the program logic to change the internal state of the AUT 28, which results in a change in the navigable simulated environment 34 displayed in the UI 36. This results in screen image 42 being updated in a next time step of the reinforcement learning loop in which the exploration policy NN 58C is trained. The reward function 118 calculates a reward 118A for the predicted environment exploration action 120 output by the exploration policy NN 58C based on the prediction error 116 for the screen image 42 produced as a result of the environment exploration action 120. When the prediction error 116 is larger, the reward 118A is larger, thereby providing a greater reward 118A to the exploration policy NN 58C when it takes environment exploration actions 120 that result in screen images 42 that are less similar to prior screen images 42 that have been inputted at prior timesteps of the reinforcement learning loop into the target NN 58A and predictor NN 58B during the exploration phase. Also as described above, if an error is discovered while exploring the navigable simulated environment 28, the environment exploration module 56 may transmit the error to the AUT 28, where it is entered in a test report 60. If no error is discovered, the record that no error was discovered may be included in the test report 60, or no report may be generated. The exploration policy NN 58C may comprise four convolution layers and four fully connected layers. However, it will be appreciated that the exploration NN policy 58C may comprise more or fewer than four convolution layers and four fully connected layers.

As described herein, the object detection module 44, the object investigation module 48, and the environment exploration module 56 comprise an integrated system for testing applications under test. The object detection module 44 detects whether there exists a key object in the screen image 42. If not, then the environment exploration module 56 will be executed to explore the navigable simulated environment 34. If the key object is detected, then the object investigation module 48 is executed to investigate the key object. When the investigation is complete, exploration of the navigable simulated environment 34 will continue via the environment exploration module 56 until a key object is discovered. Object investigation and environment exploration proceed in this manner until the entire game space of the AUT 28 has been covered.

FIG. 10 illustrates pseudo-code for an algorithm (Algorithm 1) implemented by the integrated system described above. As shown, the algorithm proceeds through a while loop of timesteps t to N, and on each pass through the while loop, uses a key detection detector (e.g., object detection module 44) to attempt to detect objects in a screen shot $s_t$ for that timestep (e.g., screen image 42). If both a bounding box size produced by the key detection detector is greater than a predetermined threshold size, and a probability that the prediction of the key detection detector exceeds a predetermined confidence threshold, then the predicted object is investigated using the investigation policy network $\pi_{investigate}$ (e.g., object investigation NN 50 of object investigation module 48) for a predetermined number L timesteps. If either the bounding box size is lower than the predetermined threshold or the probability is below the predetermined confidence threshold, then the exploration policy network $\pi_{explore}$ (e.g., exploration policy NN 58C) is called upon to produce an exploration action $a_t$ given the current screenshot $s_t$. The exploration action is fed as input into the AUT, and a next screenshot $s_{t+1}$ for the next timestep is produced by the program logic of the AUT, resulting from the selected action $a_t$. An RND-based curiosity reward is then produced by a reward function (e.g., reward function 118), which rewards the exploration policy network $\pi_{explore}$ when it produces actions that result in relatively novel screen images as compared to other screen images previously frequently encountered during the exploration phase, as described above. The exploration policy network $\pi_{explore}$ (e.g., exploration policy NN 58C) is then batch optimized every M timesteps using PPO loss, and the predictor network (e.g., predictor NN 58B) of the exploration which is batch optimized at the same time using distillation loss as compared to the fixed target network f (e.g., target network NN 58A). The result is a computationally efficient algorithm that maximizes exploration of newly encountered areas within a navigable environment, thereby increasing the likelihood of error discovery, which leads to a reduction in the number of errors in the release version of the AUT.

Figures 6A, 6B, 6C, 6D, 6E:
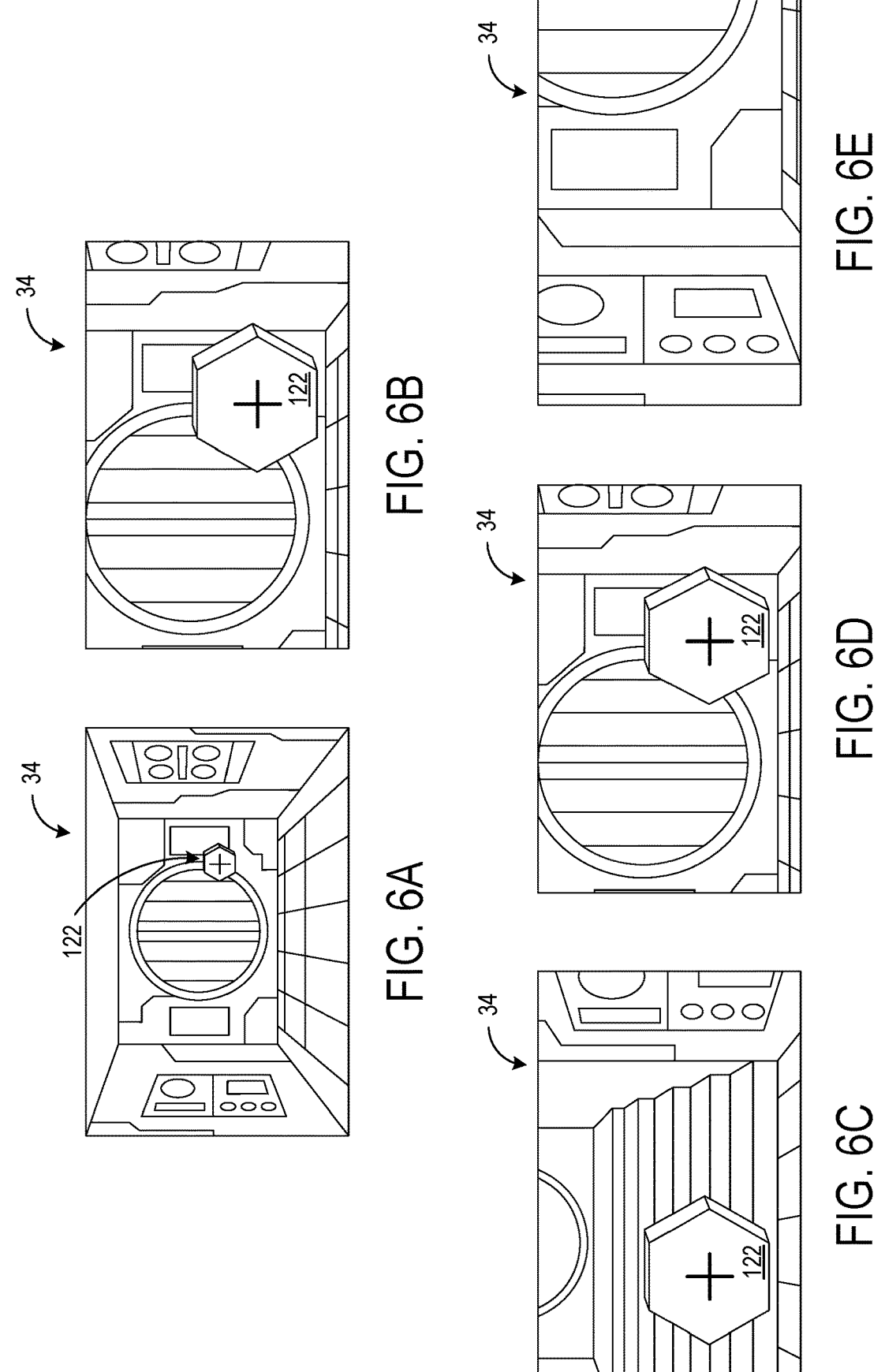
FIGS. 6A to 6E illustrate exploration of the navigable simulated environment using the computing system of FIG. 1.

An example exploration of the navigable simulated environment by the application testing system is depicted in FIGS. 6A to 6E. It will be appreciated that FIGS. 6A to 6E are shown from the point of view of a simulated player. In FIG. 6A, a key object 122 has been identified in the screen image 42. In the illustrated example, the key object 122 is configured as a health pack. However, it will be appreciated that the key objects may be configured as any number of game elements, such as food, clothing, supplies, armor, weapons, vehicles, currency, tokens, and the like, for example. As described above, the proximity of the key object 122 can be determined by the anchor points of the bounding box associated with the key object 122. As the key object appears across a room in the navigable simulated environment 34 in FIG. 6A, a simulated user input 54 may direct the simulated player to move forward to begin to investigate the key object 122, as show in FIG. 6B. FIG. 6C illustrates turning 180 degrees from the position in FIG. 6B within the navigable simulated environment 34, and FIG. 6D illustrates turning 360 degrees from the position in FIG. 6B. Once the key object 122 is investigated, as described below, the environment exploration module 56 will be executed to explore new areas of the navigable simulated environment 34, as shown in FIG. 6E.

FIGS. 7A to 7E depict investigation of the key object 122 in the navigable simulated environment 34. As with FIGS. 6A to 6E, FIGS. 7A to 7E are shown from the point of view of the simulated player. In the example shown in FIG. 7A, the key object 122 is depicted to be in close proximity to the simulated player. As such, a simulated user input 54 may be to direct the simulated player to move around the key object 122 so as to inspect it from all sides. Accordingly, FIG. 7B shows the key object 122 after the simulated player has moved 90 degrees to the left. FIG. 7C illustrates inspecting the key object 122 by moving another 90 degrees to the left to 180 degrees from the position at which investigation began, and FIG. 7D shows the key object 122 after the simulated player moves to 270 degrees from the initial investigation position. At FIG. 7E, the simulated player returns to the beginning position of investigation, and the investigation is complete. At this point, the application testing program 26 may trigger the environment exploration module 56 to discover a novel screen image 42 to test.

Figure 8:
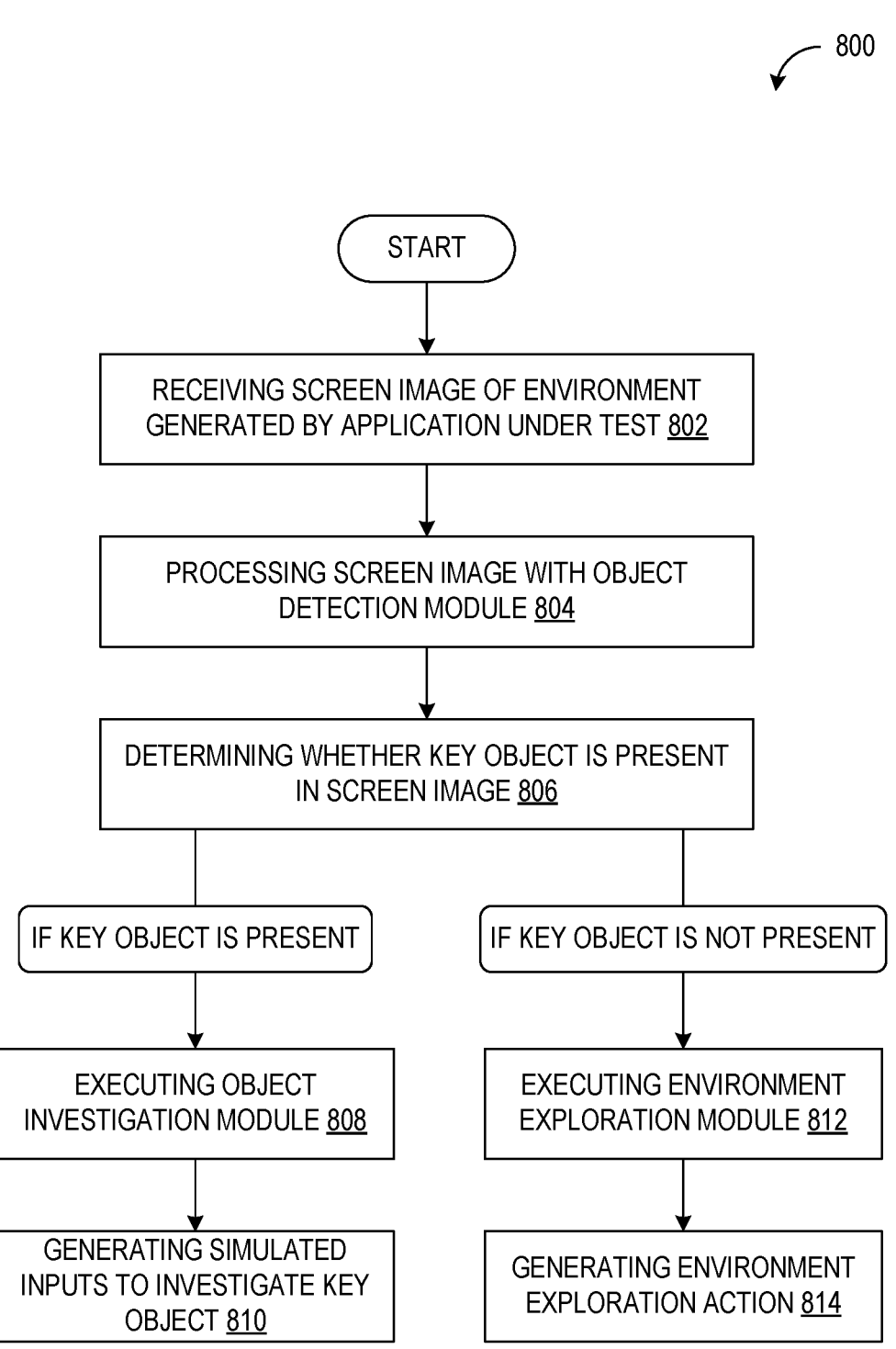
FIG. 8 shows a flow diagram of a method for pixel-based automated testing of a navigable simulated environment generated by an application under test, according to one example of the present disclosure.

FIG. 8 shows a flow diagram of a method 800 for pixel-based automated testing of a navigable simulated environment generated by an application under test, according to one example of the present disclosure. The method 800 is preferably implemented across a test computer device executing an application under test and a server computer device executing an application testing program.

At step 802, the method 800 may include, at one or more processors of a computing system, during an inference-time phase, receiving, by an application testing program including a machine learning model trained to detect errors in the application under test, a screen image of the navigable simulated environment generated by the application under test.

Continuing from step 802 to step 804, the method 800 may include processing the screen image using an object detection module to thereby determine if a key object is present in the screen image. The object detection module may include an anchor-based object detection neural network for detecting key objects in the application under test. The object detection neural network may be trained during a first initial training phase and a second initial training phase. In the first initial training phase, the object detection neural network may be trained with a first training data set derived from a common objects in context dataset. In the second initial training phase, the object detection neural network may be trained with a second training data set including labeled screen images of key objects in the application under test.

Proceeding from step 804 to step 806, the method 800 may include determining whether a key object is present in the screen image. If the key object is determined to be present in the screen image, then at step 808, the method 800 may include executing an object investigation module that receives an image of the detected key object. Advancing from step 808 to step 810, the method 800 may include generating investigation inputs to investigate the key object. The object investigation module may include an object investigation neural network that is trained with a training data set that includes pixelwise rendered image data (e.g., screen images 42) of the navigable simulated environment and human tester inputs (e.g., investigation inputs 51) as made in response to said image data, as ground truth.

If the key object is not determined to be present in the screen image, then at step 812, the method 800 may include executing an environment exploration module that receives the screen image as input and processing the screen image. The environment exploration module may include a target neural network and a predictor neural network, and the target neural network may be randomly initialized and fixed. The method may further comprise inputting the screen image to the target neural network and the predictor neural network during an exploration phase, and mapping, via each of the target neural network and the predictor neural network, the screen image to a respective embedding vector. The method may further comprise setting an output embedding vector of the target neural network during the exploration phase as ground truth for the predictor neural network, outputting, via the predictor neural network, a predicted embedding vector, and training the predictor neural network using a distillation loss function to minimize a prediction error between the output embedding vector of the target network and the predicted embedding vector.

Continuing from step 812 to step 814, the method 800 may include generating an environment exploration action to be provided to the application under test as simulated user input. An exploration neural network may be trained via a Proximal Policy Optimization (PPO) algorithm to receive the reward and generate environment exploration actions to explore the navigable simulated environment 34, thereby enabling capture of novel screen images 42. Thus, the environment exploration module may include an exploration policy neural network that is configured to predict the environment exploration action in response to receiving the screen image as input that will result in a greatest expected reward. Further, the method may comprise executing a reward function to calculate a reward for the environment exploration action taken by the exploration policy neural network based on the prediction error for the screen image produced as a result of the environment exploration action, such that when the prediction error is larger, the reward is larger, thereby providing a greater reward to the exploration policy neural network when it takes environment exploration actions that result in screen images that are less similar to prior screen images that have been inputted into the target neural network and predictor neural network during the exploration phase.

Extensive testing during computer program development helps ensure that all a computer program is free of bugs, glitches, and other errors. However, advancements in technology have led to larger and more complex computer programs, the thorough testing of which is becoming progressively costly, complicated, and time consuming. The systems and methods described herein provide a technical solution for testing advanced computer programs that feature virtual environments that are navigated by users, such as virtual reality environments, computer game environments, simulator environments, and the like with an application testing program that includes multiple neural networks across three integrated modules for detecting objects within a computer program, investigating detected objects, and exploring the environment. The application testing program receives only screen images as input for the purposes of predicting exploration actions and object investigation inputs, and is thus configured to be executed independently of an internal state of the application under test. This configuration enables the application testing program to be used with first-party applications as well as third-party applications, since no proprietary API customization is required, thus improving the interoperability of the application testing program. Additionally, the application testing program may be applied to virtually any computer program, as screen images of different sizes from various programs can be easily resized to a size suitable for the application testing program. Further, since the exploration policy neural network uses random network distillation, it need not be trained on any application-specific images and thus can be applied to screen images from virtually any AUT, increasing its breadth of usability. Moreover, computer program developers can update the source code for the application under test during testing without maintaining deep integration of a testing algorithm as the source code changes during program development. As a result, computer program testing can be effectively and thoroughly performed across a broad spectrum of computer programs with minimal human input and without access to the source code, thereby lowering cost, complexity, and duration of the testing.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
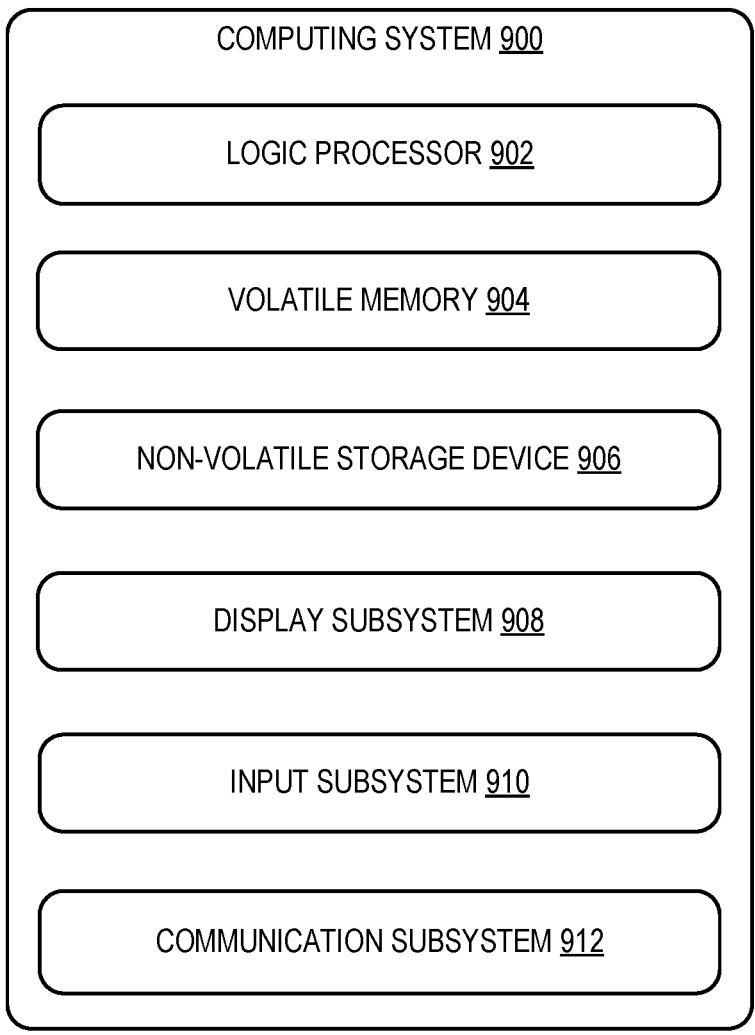
FIG. 9 shows a schematic view of an example computing environment in which the computer system of FIG. 1 may be implemented.

FIG. 9 schematically shows a non-limiting embodiment of a computing system 900 that can enact one or more of the methods and processes described above. Computing system 900 is shown in simplified form. Computing system 900 may embody the computing device 10 described above and illustrated in FIG. 1. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display sub system 908, input sub system 910, communication sub system 912, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed, e.g., to hold different data.

Non-volatile storage device 906 may include physical devices that are removable and/or built in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraphs provide additional description of aspects of the present disclosure. One aspect provides a computing system for pixel-based automated testing of a navigable simulated environment generated by an application under test. The computing system may include a computing device including one or more processors configured to execute instructions using portions of associated memory to implement, during an inference-time phase, an application testing program. The application testing program may include a machine learning model trained to detect errors in the application under test. The application testing program may be configured to receive a screen image of the navigable simulated environment generated by the application under test, and process the screen image using an object detection module to thereby determine if a key object is present in the screen image. If a key object is determined to be present in the screen image, then the application testing program may be configured to execute an object investigation module that receives an image of the detected key object, and generates investigation inputs to investigate the key object. If a key object is not determined to be present in the screen image, then the application testing program may be configured to execute an environment exploration module that receives the screen image as input, and processes the screen image to generate an environment exploration action to be provided to the application under test as simulated user input.

In this aspect, additionally or alternatively, the object detection module may include an anchor-based object detection neural network for detecting key objects in the application under test. In this aspect, additionally or alternatively, the object detection neural network may be trained during a first initial training phase with a first training data set derived from a common objects in context data set, and the object detection neural network may be trained during a second initial training phase with a second training data set including labeled screen images of key objects in the application under test.

In this aspect, additionally or alternatively, the object investigation module may include an object investigation neural network that is trained with a training data set that includes pixelwise rendered image data of the navigable simulated environment and human tester actions made in response to said image data.

In this aspect, additionally or alternatively, the environment exploration module may include a target neural network and a predictor neural network, the screen image may be input to the target neural network and the predictor neural network during an exploration phase, and each of the target neural network and the predictor neural network may map the screen image to a respective embedding vector.

In this aspect, additionally or alternatively, the target neural network may be randomly initialized and fixed, and an output embedding vector of the target neural network during the exploration phase may be set as ground truth for the predictor neural network. The predictor neural network may output a predicted embedding vector and may be trained using a distillation loss function to minimize a prediction error between the output embedding vector of the target network and the predicted embedding vector.

In this aspect, additionally or alternatively, the environment exploration module may include an exploration policy neural network that is configured to predict the environment exploration action in response to receiving the screen image as input that will result in a greatest expected reward. In this aspect, additionally or alternatively, the one or more processors may be configured to execute a reward function to calculate a reward for the environment exploration action taken by the exploration policy neural network based on the prediction error for the screen image produced as a result of the environment exploration action, such that when the prediction error is larger, the reward is larger, thereby providing a greater reward to the exploration policy neural network when it takes environment exploration actions that result in screen images that are less similar to prior screen images that have been inputted into the target neural network and predictor neural network during the exploration phase.

In this aspect, additionally or alternatively, the application testing program may receive only screen images as input, and is configured to be executed independently of an internal state of the application under test.

Another aspect provides a method for pixel-based automated testing of a navigable simulated environment generated by an application under test. The method may comprise, at one or more processors of a computing system, during an inference-time phase, receiving, by an application testing program including a machine learning model trained to detect errors in the application under test, a screen image of the navigable simulated environment generated by the application under test. The method may further comprise processing the screen image using an object detection module to thereby determine if a key object is present in the screen image. If the key object is determined to be present in the screen image, then the method may further comprise executing an object investigation module that receives an image of the detected key object, and generating investigation inputs to investigate the key object. If the key object is not determined to be present in the screen image, then the method may further comprise executing an environment exploration module that receives the screen image as input, and processing the screen image to generate an environment exploration action to be provided to the application under test as simulated user input.

In this aspect, additionally or alternatively, the method may further comprise detecting key objects in the application under test via an anchor-based object detection neural network included in the object detection module.

In this aspect, additionally or alternatively, the method may further comprise training the object detection neural network during a first initial training phase with a first training data set derived from a common objects in context data set, and training the object detection neural network during a second initial training phase with a second training data set including labeled screen images of key objects in the application under test.

In this aspect, additionally or alternatively, the method may further comprise training an object investigation neural network included in the object investigation module with a training data set that includes pixelwise rendered image data of the navigable simulated environment and human tester action made in response to said image data.

In this aspect, additionally or alternatively, the environment exploration module may include a target neural network and a predictor neural network. The target neural network may be randomly initialized and fixed, and the method may further comprise inputting the screen image to the target neural network and the predictor neural network during an exploration phase, and mapping, via each of the target neural network and the predictor neural network, the screen image to a respective embedding vector.

In this aspect, additionally or alternatively, the method may further comprise setting an output embedding vector of the target neural network during the exploration phase as ground truth for the predictor neural network, outputting, via the predictor neural network, a predicted embedding vector, and training the predictor neural network using a distillation loss function to minimize a prediction error between the output embedding vector of the target network and the predicted embedding vector.

In this aspect, additionally or alternatively, the environment exploration module may include an exploration policy neural network that is configured to predict the environment exploration action in response to receiving the screen image as input that will result in a greatest expected reward.

In this aspect, additionally or alternatively, the method may further comprise executing a reward function to calculate a reward for the environment exploration action taken by the exploration policy neural network based on the prediction error for the screen image produced as a result of the environment exploration action, such that when the prediction error is larger, the reward is larger, thereby providing a greater reward to the exploration policy neural network when it takes environment exploration actions that result in screen images that are less similar to prior screen images that have been inputted into the target neural network and predictor neural network during the exploration phase.

In this aspect, additionally or alternatively, the method may further comprise receiving, by the application testing program, only screen images as input for predicting investigation inputs and environment exploration actions, and executing the application testing program independently of an internal state of the application under test.

Another aspect provides a computing system for pixel-based automated testing of a navigable simulated environment generated by an application under test. The computing system may include a computing device including one or more processors configured to execute instructions using portions of associated memory to implement, during an inference-time phase, an application testing program. The application testing program may include a machine learning model trained to detect errors in the application under test. The application testing program may be configured to receive a screen image of the navigable simulated environment generated by the application under test, and process the screen image using an object detection module to thereby determine if a key object is present in the screen image. If a key object is not determined to be present in the screen image, then the application testing program may be configured to execute an environment exploration module that receives the screen image as input, and processes the screen image to generate an environment exploration action to be provided to the application under test as simulated user input.

In this aspect, additionally or alternatively, the environment exploration module may include an exploration policy neural network that is configured to predict the environment exploration action in response to receiving the screen image as input that will result in a greatest expected reward, and the one or more processors may be configured to execute a reward function to calculate a reward for the environment exploration action taken by the exploration policy neural network based on the prediction error for the screen image produced as a result of the environment exploration action.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for pixel-based automated testing of a navigable simulated environment generated by an application under test, comprising:
a computing device including one or more processors configured to execute instructions using portions of associated memory to implement, during an inference-time phase:
an application testing program including a machine learning model trained to detect errors in the application under test, wherein the application testing program is configured to:
receive a screen image of the navigable simulated environment generated by the application under test, and process the screen image using an object detection module to thereby determine if a key object is present in the screen image;
if a key object is determined to be present in the screen image, then execute an object investigation module that receives an image of the detected key object, and generates investigation inputs to investigate the key object; and
if a key object is not determined to be present in the screen image, then execute an environment exploration module that receives the screen image as input, and processes the screen image to generate an environment exploration action to be provided to the application under test as simulated user input.

2. The computing system of claim 1, wherein the object detection module includes an anchor-based object detection neural network for detecting key objects in the application under test.

3. The computing system of claim 2, wherein the object detection neural network is trained during a first initial training phase with a first training data set derived from a common objects in context data set, and the object detection neural network is trained during a second initial training phase with a second training data set including labeled screen images of key objects in the application under test.

4. The computing system of claim 1, wherein the object investigation module includes an object investigation neural network that is trained with a training data set that includes pixelwise rendered image data of the navigable simulated environment and human tester actions made in response to said image data.

5. The computing system of claim 1, wherein the environment exploration module includes a target neural network and a predictor neural network, the screen image is input to the target neural network and the predictor neural network during an exploration phase, and each of the target neural network and the predictor neural network map the screen image to a respective embedding vector.

6. The computing system of claim 5, wherein the target neural network is randomly initialized and fixed, and an output embedding vector of the target neural network during the exploration phase is set as ground truth for the predictor neural network, and the predictor neural network outputs a predicted embedding vector and is trained using a distillation loss function to minimize a prediction error between the output embedding vector of the target network and the predicted embedding vector.

7. The computing system of claim 6, wherein the environment exploration module includes an exploration policy neural network that is configured to predict the environment exploration action in response to receiving the screen image as input that will result in a greatest expected reward.

8. The computing system of claim 7, wherein the one or more processors are configured to execute a reward function to calculate a reward for the environment exploration action taken by the exploration policy neural network based on the prediction error for the screen image produced as a result of the environment exploration action, such that when the prediction error is larger, the reward is larger, thereby providing a greater reward to the exploration policy neural network when it takes environment exploration actions that result in screen images that are less similar to prior screen images that have been inputted into the target neural network and predictor neural network during the exploration phase.

9. The computing system of claim 1, wherein the application testing program receives only screen images as input, and is configured to be executed independently of an internal state of the application under test.

10. A method for pixel-based automated testing of a navigable simulated environment generated by an application under test, the method comprising:

at one or more processors of a computing system, during an inference-time phase:

receiving, by an application testing program including a machine learning model trained to detect errors in the application under test, a screen image of the navigable simulated environment generated by the application under test;

processing the screen image using an object detection module to thereby determine if a key object is present in the screen image;

if the key object is determined to be present in the screen image, then executing an object investigation module that receives an image of the detected key object, and generating investigation inputs to investigate the key object; and if the key object is not determined to be present in the screen image, then executing an environment exploration module that receives the screen image as input, and processing the screen image to generate an environment exploration action to be provided to the application under test as simulated user input.

11. The method of claim 10, the method further comprising:

detecting key objects in the application under test via an anchor-based object detection neural network included in the object detection module.

12. The method of claim 11, the method further comprising:

training the object detection neural network during a first initial training phase with a first training data set derived from a common objects in context data set, and training the object detection neural network during a second initial training phase with a second training data set including labeled screen images of key objects in the application under test.

13. The method of claim 10, the method further comprising:

training an object investigation neural network included in the object investigation module with a training data set that includes pixelwise rendered image data of the navigable simulated environment and human tester action made in response to said image data.

14. The method of claim 10, wherein the environment exploration module includes a target neural network and a predictor neural network, wherein the target neural network is randomly initialized and fixed, the method further comprising:

inputting the screen image to the target neural network and the predictor neural network during an exploration phase; and mapping, via each of the target neural network and the predictor neural network, the screen image to a respective embedding vector.

15. The method of claim 14, further comprising:

setting an output embedding vector of the target neural network during the exploration phase as ground truth for the predictor neural network;

outputting, via the predictor neural network, a predicted embedding vector; and training the predictor neural network using a distillation loss function to minimize a prediction error between the output embedding vector of the target network and the predicted embedding vector.

16. The method of claim 15, wherein the environment exploration module includes an exploration policy neural network that is configured to predict the environment exploration action in response to receiving the screen image as input that will result in a greatest expected reward.

17. The method of claim 16, further comprising:

executing a reward function to calculate a reward for the environment exploration action taken by the exploration policy neural network based on the prediction error for the screen image produced as a result of the environment exploration action, such that when the prediction error is larger, the reward is larger, thereby providing a greater reward to the exploration policy neural network when it takes environment exploration actions that result in screen images that are less similar to prior screen images that have been inputted into the target neural network and predictor neural network during the exploration phase.

18. The method of claim 10, the method further comprising:

receiving, by the application testing program, only screen images as input for predicting investigation inputs and environment exploration actions; and executing the application testing program independently of an internal state of the application under test.

19. A computing system for pixel-based automated testing of a navigable simulated environment generated by an application under test, comprising:

a computing device including one or more processors configured to execute instructions using portions of associated memory to implement, during an inference-time phase:

an application testing program including a machine learning model trained to detect errors in the application under test, wherein the application testing program is configured to:

receive a screen image of the navigable simulated environment generated by the application under test, and process the screen image using an object detection module to thereby determine if a key object is present in the screen image;

if a key object is not determined to be present in the screen image, then execute an environment exploration module that receives the screen image as input, and processes the screen image to generate an environment exploration action to be provided to the application under test as simulated user input.

20. The computing system of claim 19, wherein the environment exploration module includes an exploration policy neural network that is configured to predict the environment exploration action in response to receiving the screen image as input that will result in a greatest expected reward, and the one or more processors are configured to execute a reward function to calculate a reward for the environment exploration action taken by the exploration policy neural network based on the prediction error for the screen image produced as a result of the environment exploration action.

* * * * *